United States Patent Office 3,753,918
Patented Aug. 21, 1973

3,753,918
SOLUTION OF ALKALI METAL TRITHIOCARBONATE IN DIMETHYL SULFOXIDE
Rudiger D. Haugwitz, Highland Park, N.J., assignor to Olin Corporation
No Drawing. Original application Jan. 27, 1970, Ser. No. 6,300, now Patent No. 3,660,412. Divided and this application Mar. 21, 1972, Ser. No. 236,787
Int. Cl. C01b 31/26
U.S. Cl. 252—182       2 Claims

ABSTRACT OF THE DISCLOSURE

Carbon bisulfide is reacted with alkali metal hydroxide in dimethyl sulfoxide to form a solution of alkali metal trithiocarbonate.

---

This is a division of co-pending application Ser. No. 6,300 filed Jan. 27, 1970, now Pat. No. 3,660,412.

This invention relates to improvements in the preparation of alkali metal trithiocarbonates and trithiocarbonate esters. More particularly, it relates to preparing alkali metal trithiocarbonates from the alkali metal hydroxide and carbon bisulfide in dimethyl sulfoxide (DMSO) and then reacting the alkali metal trithiocarbonate in dimethyl sulfoxide solution with an organic halide reactive therewith to produce a trithiocarbonate ester. The reaction time in the first step is a few hours and in the second step is a few minutes. The organic halides are readily accessible and the preparation of mercaptans as intermediates is avoided. The use of $H_2S$ is avoided and yields are good.

Wertheim, J. Am. Chem. Soc. 48, 826 (1926), prepared aqueous trithiocarbonate solutions from aqueous ammonia and carbon bisulfide on standing a few weeks and reacted these solutions with alkyl halides to prepare trithiocarbonate esters in poor yields.

Strube, Org. Synth. 39, 77, prepared aqueous potassium trithiocarbonate from KOH, $H_2S$ and $CS_2$ and reacted the solution with aqueous potassium chloroacetate, then acidifying to produce trithiocarbodiglycolic acid.

Frank et al., J. Polymer Science 3, 50 (1948), reacted n-dodecyl mercaptan with KOH and $CS_2$, then n-dodecyl bromide was reacted with the first reaction mixture to form n-dodecyl trithiocarbonate. These authors disclose the utility of trithiocarbonate esters as modifiers in styrene-butadiene copolymerization.

Fungicidal utility of trithiocarbonate esters is disclosed by Nase, Z. Chem. (3), 96 (1968).

In the process of this invention, trithiocarbonate esters are prepared by a first step of reacting alkali metal hydroxide with carbon disulfide in dimethyl sulfoxide to form a solution of alkali metal trithiocarbonate in dimethyl sulfoxide and a second step of reacting said solution with an organic halide to form a mixture containing a trithiocarbonate ester and separating said trithiocarbonate ester from said mixture.

The first step of the process is carried out suitably at room temperatures and the second step at temperatures up to 100° C. These temperatures are not critical.

Preferably an excess of carbon bisulfide over the stoichiometric molar ratio of 1:1 is used in the first step, suitably about 2:1 but any ratio from 1:1 to 10:1 is satisfactory.

Any of the alkali metal hydroxides are suitable but sodium hydroxide and potassium hydroxide are preferred.

The stoichiometric ratio of alkali metal trithiocarbonate to organic halide is 0.5:1 but preferably an excess of alklai metal trithiocarbonate is used when the halide is more expensive than the alkali metal trithiocarbonate. Molar ratios of from 0.5:1 to 2:1 are suitable, preferably from 1:1 to 1.5:1.

Suitable organic halides are those reactive with alkali metal trithiocarbonates to produce trithiocarbonate esters. These include hydrocarbyl or substituted hydrocarbyl halides and heterocyclic halides including alkyl and alkylene halides which may be primary, secondary or tertiary, carboxyl-substituted alkyl halides, aryl halides, aralkyl halides, alkaryl halides, especially nitro-aryl halides. Specific examples include ethyl bromide, 2-ethylhexyl bromide, dodecyl bromide, octadecyl bromide, ethylene dichloride, potassium chloroacetate, ethyl chloroacetate, benzyl chloride, p-bromobenzyl chloride, o-nitrochlorobenzene, pentachloropyridine. The halides are suitably chlorides or bromides.

The addition of minor amounts of water to the DMSO solution of $K_2CS_3$ is sometimes advantageous in ester formation particularly when the organic halide is water-soluble, for example, potassium chloroacetate.

EXAMPLE I n-Dodecyl trithiocarbonate

A mixture of 30 ml. of DMSO (dimethyl sulfoxide), 17 g. (0.3 mole) KOH and 40 ml. (50 g.; 0.66 mole) of $CS_2$ was stirred in a stoppered vessel at room temperature overnight. The excess $CS_2$ was decanted and the volume was brought to 90 ml. by adding more DMSO. A mixture of 10 ml. of the DMSO solution and 3.3 g. (0.013 mole) n-dodecyl bromide was heated on the steam bath for ten minutes, after which the original red brown color had turned lighter. About 20 ml. of water was added and the product was extracted with ether. On evaporation, 2.7 g. of n-dodecyl trithiocarbonate was obtained which is a yield of 91 percent based on the n-dodecyl bromide. Recrystallization from acetone furnished the pure product having a melting point of 49–50° C.

Calc. for $C_{25}H_{50}S_3$: C, 67.19; H, 11.28 percent. Found: C, 67.32; H, 11.36 percent.

EXAMPLE II

Trithiocarbodiglycolic acid

A mixture of 33.6 g. (0.6 mole) of potassium hydroxide pellets, 30 ml. of dimethyl sulfoxide and 70 ml. (85 g.; 1.1 mole) carbon bisulfide was vigorously stirred for 6 to 10 hours at room temperature until most of the potassium hydroxide pellets dissolved. Excess carbon bisulfide was decanted from the viscous red-brown solution and 60 ml. of water was added. To this potassium trithiocarbonate solution was added 70 g. of sodium chloroacetate dissolved in 100 ml. of water, maintaining the temperature below 40° C. After the addition was completed, the mixture was stirred for 30 minutes, then cooled in an ice bath and acidified with concentrated hydrochloric acid. The yellow precipitate was filtered, washed with water and dried to yield 30 g. of trithiocarbodiglycolic acid in a yield of 44 percent based on the chloroacetate used. The product melted at 170–172° C.

Calc. for $C_5H_6O_4S_3$: C, 26.56; H, 2.67 percent. Found: C, 26.51; H, 2.42 percent.

EXAMPLE III

Tetrachloropyridyl trithiocarbonate

To 10 ml. of DMSO solution containing 0.017 mole of potassium trithiocarbonate prepared as described in Example I was added 3 g. (0.012 mole) of pentachloropyridine. The mixture was heated on the steam bath for 10 minutes, cooled and filtered. The solid was washed with acetone, ether and water and recrystallized from a mixture of chloroform and ether. The resulting tetrachloropyridyl trithiocarbonate melted at 260° C.

EXAMPLE IV o-Nitrophenyl trithiocarbonate

To 10 ml. of the DMSO solution of potassium trithiocarbonate prepared as described in Example I was added 2.7 g. (0.013 mole) of o-nitrobromobenzene. The mixture was heated on the steam bath for 5 minutes, diluted with water and extracted with chloroform. Evaporation of the chloroform yielded 2.3 g. or 50 percent yield of o-nitrophenyl trithiocarbonate. It was recrystallized from a mixture of acetone and petroleum ether.

EXAMPLE V

Ethylene trithiocarbonate

To 10 ml. of the DMSO solution of potassium trithiocarbonate prepared as described in Example I was added 0.7 g. (0.00715 mole) of ethylene dichloride. The mixture was heated on the steam bath for 5 minutes, cooled and extracted with chloroform. Evaporation of the chloroform yielded 0.5 g., a 51.5 percent yield of ethylene trithiocarbonate based on the ethylene dichloride used. Recrystallized from a mixture of ether and petroleum ether, it melted at 33–35° C.

Calc. for $C_3H_4S_3$: C, 26.44; H, 2.96 percent. Found: C, 26.20; H, 2.78 percent.

What is claimed is:

1. As a composition of matter, a solution of alkali metal trithiocarbonate in dimethyl sulfoxide prepared by reacting carbon bisulfide with an alkali metal hydroxide in dimethyl sulfoxide wherein the molar ratio of carbon bisulfide to alkali metal hydroxide is about 1:1 to 10:1.

2. A composition of matter as claimed in claim 1 in which said alkali metal is potassium.

References Cited

UNITED STATES PATENTS

| | | | |
|---|---|---|---|
| 2,893,835 | 7/1959 | Stone et al. | 423—428 |
| 3,551,499 | 12/1970 | Krockow | 260—344 B |

MAYER WEINBLATT, Primary Examiner

I. GLUCK, Assistant Examiner

U.S. Cl. X.R.

260—294.8 E, 455 B; 423—428; 424—301; 252—Dig. 4